US007312282B2

(12) United States Patent
Trivedi et al.

(10) Patent No.: US 7,312,282 B2
(45) Date of Patent: Dec. 25, 2007

(54) PROCESS OF PREPARATION OF BLOCK COPOLYMERS AND THE BLOCK COPOLYMERS PREPARED THEREFROM

(76) Inventors: Prakash Druman Trivedi, 587, Parag, 18th Road, Khar, Mumbai, Maharashtra (IN) 400052; Atulkumar Ramaniklal Raja, 19/B Maurya Residence, Gitangali Co-Operative Society, Kapodara Chokdi, Ankleshwar, Gujarat (IN) 393002; Mukesh Shambhubhai Jesani, B-48 Bhagwati Nagar, Behind Welcome Nagar, Near Gadkhol Patia, Ankleshwar, Gujarat (IN) 393001

( * ) Notice: Subject to any disclaimer, the term of this patent is extended or adjusted under 35 U.S.C. 154(b) by 35 days.

(21) Appl. No.: 10/897,405

(22) Filed: Jul. 23, 2004

(65) Prior Publication Data

US 2005/0228149 A1 Oct. 13, 2005

(30) Foreign Application Priority Data

Apr. 1, 2004 (IN) .................................. 400/2004

(51) Int. Cl.
*C08G 65/40* (2006.01)
(52) U.S. Cl. ..................... 525/534; 525/535; 525/906; 528/86; 528/127
(58) Field of Classification Search ................ 525/534, 525/535, 906; 528/86, 127
See application file for complete search history.

(56) References Cited

U.S. PATENT DOCUMENTS

| | | | |
|---|---|---|---|
| 4,476,184 A | | 10/1984 | Lubowitz et al. |
| 4,533,721 A | * | 8/1985 | Kurosawa et al. .......... 528/174 |
| 4,960,841 A | | 10/1990 | Kawabata et al. |
| 5,077,351 A | | 12/1991 | Matzner et al. |
| 5,204,400 A | | 4/1993 | Kelly et al. |
| 5,446,096 A | | 8/1995 | Drzewinski |
| 5,446,120 A | * | 8/1995 | Lubowitz et al. ........... 528/171 |
| 5,500,479 A | | 3/1996 | Meltzer et al. |
| 5,587,435 A | | 12/1996 | Meltzer et al. |
| 5,633,331 A | | 5/1997 | Nichols et al. |
| 5,700,903 A | | 12/1997 | Hancock et al. |
| 5,798,437 A | | 8/1998 | Hancock et al. |
| 5,834,583 A | | 11/1998 | Hancock et al. |
| 6,172,180 B1 | | 1/2001 | Hancock et al. |
| 6,444,758 B2 | | 9/2002 | McNamara et al. |

2001/0021764 A1 * 9/2001 Weisse et al. ................ 528/171

OTHER PUBLICATIONS

Harrison, W. L. "Synthesis and Characterization of Sulfonated Poly(Arylene Ether Sulfone) Copolymers via Direct Copolymerization: Candidates for Proton Exchange Membrane Fuel Cells", Dissertation, Dec. 3, 2002.
Kuang, L. et al. "Syntheses and Characterisation of Polyphenylene Sulphide-Polyether Sulphone(PPS-PES) Block Copolymers", *Journal of Applied Polymer Science*, vol. 61(9) pp. 1607-1614, 1996. ABSTRACT.
Auman, B.C. "Synthesis and Characterization of Some Novel Block Copolymers", *Dissertations Abstracts International*, vol. 4807B p. 1990-2207, 1987. ABSTRACT.
Bourgeois, Y. et al. "Synthesis of a poly(aryl ether sulfone)—poly(aryl ether ketone) triblock copolymer", *Polymer*, vol. 37(24) pp. 5503-5511, 1996. ABSTRACT.
Cao, J. et al. "Crystallization behaviour of poly(ether ether ketone)/poly(ether sulfone) block copolymer", *Polymer*, vol. 37(20) pp. 4579-4584, 1996. ABSTRACT.
Pospiech, D. et al. "LC multiblock copolymers containing polysulfone segments. II. Material properties", *Journal of Applied Polymer Science*, vol. 64(4) pp. 619-630, 1997. ABSTRACT.
Pospiech, D. et al. "Multiblock copolymers", http://www.ipfdd.de/research/res21/res21.html.
Hancock, L.F. et al. "Hydrophilic, semipermeable membranes fabricated with poly(ethylene oxide)-polysulfone block copolymer", Biomaterials, vol. 21(7) pp. 725-733, 2000. ABSTRACT.

* cited by examiner

*Primary Examiner*—Kuo-Liang Peng
(74) *Attorney, Agent, or Firm*—Joshua B. Goldberg; Susanne M. Hopkins; Harold L. Novick

(57) ABSTRACT

Processes for preparing block copolymers and the block copolymers prepared therefrom comprising at least two types of homoblock, all belonging to the polysulfone family, wherein each of the said homoblocks has an identical or different molecular weight of at least 1000 and comprises at least 5% of the overall weight of the block copolymer, and wherein the block copolymer has a molecular weight of at least 2000, the process steps comprising preparing each of the aforesaid homoblocks by reacting at least one aromatic diol with at least one aromatic dihalo compound, one of which contains at least one sulfone group, in at least one aprotic solvent in the presence of at least one alkali, optionally in the presence of an azeotropic agent and then reacting the aforesaid homoblocks together in at least an aprotic solvent, optionally followed by end-capping said block copolymer. The invention also relates to the block copolymers themselves, which are useful for molding, extrusion and can also be used as compatibilizers for their high molecular weight homologues.

8 Claims, No Drawings

PROCESS OF PREPARATION OF BLOCK COPOLYMERS AND THE BLOCK COPOLYMERS PREPARED THEREFROM

FIELD OF THE INVENTION

The present invention relates to processes for preparing block copolymers in a family of polysulfones, i.e. polymers containing sulfone linkages, particularly Polysulfones (PSU), Polyether Sulfones (PES) and Polyphenylene Sulfones (PPSU), and to block copolymers prepared therefrom. Furthermore, the present invention relates to di- and tri-blocks, as well as random multi-block copolymers and processes of their preparation. These homoblocks may have varying molecular weights or may have similar molecular weights as compared to their original molecular weights, when present in block copolymers. These block copolymers show essentially a single glass transition temperature (Tg), good transparency and can be readily processed using traditional plastics processing techniques. They can be used directly for molding, extrusion and also used as compatibilizers for their high molecular weight homologues.

BACKGROUND OF THE INVENTION

The family of polysulfone polymers is well known in the art and three types of polysulfone have been available commercially viz. Polysulfone (PSU), Polyether Sulfone (PES) and Polyphenylene Sulfone (PPSU).

The commercially available Polysulfones (PSU, PPSU, PES) have good high temperature resistance and generally do not degrade or discolor at their processing temperatures of 350° C. to 400° C. Additionally, they are transparent, light amber colored amorphous plastics with excellent mechanical and electrical properties, and good chemical and flame resistance. These Polysulfones are readily processible using common plastics processing techniques such as injection molding, compression molding, blow molding and extrusion. This makes them very versatile and useful plastics, having a myriad of applications in electronics, the electrical industry, medicine, general engineering, food processing and other industries.

The Polysulfone PSU was discovered in early 1960 at Union Carbide (U.S. Pat. No. 4,108,837, 1978). Since then, activity in improving the quality of PSU has remained strong and improvements in color, thermal stability, molecular weights and reduction in residual monomer and solvent are continuously sought.

While, there are many similarities among PSU, PES, and PPSU as regards color, electrical properties, chemical resistance, flame resistance etc., there are also important differences. The foremost difference among these is the Glass Transition Temperature (Tg). PSU has a Tg of 189° C., PES has a Tg of 225° C., while PPSU has a Tg of 222° C. Thus, PSU has a lower overall thermal resistance in terms of its dimensional stability compared to PPSU and especially PES, which has the highest thermal resistance. Besides this, PES also has a higher tensile strength (>90 MPa) compared to PSU and PPSU (both 70-75 MPa). On the other hand, PPSU, like Polycarbonate (PC), has an outstanding impact resistance, and its Izod notched impact strength is 670-700 J/m. Both PES and PSU have lower Izod notched impact strengths of only 50-55 J/m. Similarly, it is known in the art that articles made from PPSU can withstand >1000 sterilization cycles without crazing, while PSU based articles withstand about 80 cycles and PES based articles withstand only about 100 cycles. PSU, on the other hand, has the lightest color and can be more readily processed, while PPSU is darker and more difficult to process than either PSU or PES.

Thus, a combination of PSU properties such as easy processability and light color properties with PPSU properties such as high temperature and impact resistance would be desirable. Incorporating a proportion of PSU into PPSU may also bring down the overall cost. Although the physical blending of PPSU and PSU is one way of accomplishing this, it destroys one of the most important properties of both the homopolymers, namely their transparency. Similarly, a physical blend of PES and PSU is not only opaque, but also cannot be processed to give blends with desirable properties since they are very incompatible polymers.

Other polysulfone combinations, as discussed later, are also desirable as they give higher Tg's than that of PES, further boosting the high temperature resistance of these polymers by incorporating these units and making them more readily processible by incorporating PES, PSU or PPSU into their chain structures.

The unit chain structures of the part of family of polysulfones are given below:

| | |
|---|---|
| PPSU: | —C$_6$H$_4$—SO$_2$—C$_6$H$_4$—O—C$_6$H$_4$—C$_6$H$_4$—O— |
| PSU: | —C$_6$H$_4$—SO$_2$—C$_6$H$_4$—O—C$_6$H$_4$—C(CH$_3$)$_2$—O— |
| PES: | —C$_6$H$_4$—SO$_2$—C$_6$H$_4$—O—C6H4—SO2—C6H4—O— |
| PSS: | —C6H4—C6H4—O—C6H4—SO2—C6H4—C6H4—SO2—C6H4—O— |

The representative polysulfones shown above are prepared using one or more aromatic Dihalo compound such as Dichlorodiphenyl sulfone (DCDPS) or Dichlorodiphenyl disulfonylbiphenyl (CSB) and one or more of aromatic di-hydroxy monomer such as Bisphenol A, Dihydroxy diphenylsulfone (DHDPS), Biphenol, Dihydroxy diphenyl ether, Dihydroxy diphenyl methane, or their respective mono, di or tetra substituted Methyl derivatives, etc.

For PPSU, the di-hydroxy compound used is Biphenol (HO—C$_6$H$_4$—C$_6$H$_4$—OH), for PES, it is DHDPS (—HO—C6H4—SO2—C6H4—OH) and for PSU, it is Bisphenol A (HO—C$_6$H$_4$—C(CH$_3$)$_2$—C$_6$H$_4$—OH), while DCDPS (Cl—C6H4—SO2—C6H4—Cl) is used as the aromatic dihalo compound for all three of these commercially available polysulfones.

The use of more than one dihydroxy monomers is also known. For example, "PAS", polyaryl sulfone, manufactured by Amoco is known to include a small quantity of hydroquinone in addition to DCDPS and DHDPS. The third monomer is added at the start of the manufacturing process and so gets polymerized in a random sequence in the polymer chain.

Other random copolymers in the prior art have shown that a third monomer may be added in much larger quantities. Thus, GB Patent 4,331,798 (1982) and U.S. Pat. No. 5,326,834 (1994) teach the preparation of terpolymers using 80-40 mole % of DHDPS and correspondingly 20-60 mole % of Biphenol with equivalent mole % of DCDPS. Since both patents teach that polymerization is to be started with the monomers themselves, it can be seen that the distribution of DHDPS and Biphenol in the final copolymer will be at random. Thus, one gets a random sequence such as: -ABAABBBAABAAABBABABBAAABB-, where A and B are present in a random sequence and in variable amounts depending upon the initial concentrations of A and B or DHDPS and Biphenol. The DCDPS moiety will be present in between A-A, A-B & B-B groups, although not shown here. Similarly, European Patent No. 0,331,492 teaches the synthesis of random terpolymers of DCDPS and DHDPS/Biphenol or Bisphenol A/Biphenol. The synthesis starts with three monomers and gives random terpolymers (and not block copolymers) in which the sequence of A & B in the chains cannot be predicted.

The prior art shows that block copolymers have been prepared where only one of the blocks is polysulfone. Hedtmann-Rein and Heinz (U.S. Pat. No. 5,036,146-1991) teach the preparation of a block copolymer of PSU with a polyimide (PI). In this case, a homoblock of an amine terminated polysulfone was prepared first. This was preformed using DCDPS, Bisphenol A and p-aminophenol to give a homoblock having a molecular weight in the range of 1500 to 20000. The homoblock produced was subsequently reacted with a tetracarboxylic acid, such as benzophenon-etetracarboxylic dianhydride, and another diamine, such as 4,4'-diaminodiphenylmethane, to make a block copolymer of PSU-PI. The copolymers were prepared in the melt phase at 350° C.

McGrath and coworkers (Polymer preprints, 25, 14, 1984) have prepared PSU-Polyterphthalate copolymers. This was done using DCDPS (0.141 mole) and a mixture of hydroquinone and biphenol (0.075 mole each) to give a homoblock in solution, and then reacting the homoblock with a terephthaloyl chloride and biphenol, using solution or interfacial techniques, to give a block copolymer.

McGrath et al (Polymer Preprints, 26, 275, 1985) have further described preparations using acetyl end capped PSU with p-acetoxy benzoic acid or biphenol diacetate/terephthalic acid to obtain block copolymers of PSU/Polyethers, the latter part being highly crystalline or even liquid crystalline polymers. The synthesis of the block copolymer was carried out as a melt or in the presence of diphenyl sulfone at 200-300° C. Block copolymer preparation was indicated by the fact that the product was not soluble in common organic solvents.

McGrath and coworkers (Polymer Preprints, 26, 277, 1985) have also developed block copolymers of PSU and PEEK using a hydroxy terminated oligomeric PSU homoblock and difluoro benzophenone alone or optionally adding hydroquinone and/or biphenol. The first method, rather than giving a block copolymer, gives PSU blocks joined by difluorobenzophenone. However, the second method has the possibility of producing both random and block structures in the copolymers of PSU and PEEK.

While the above investigations have prepared PSU block copolymers, it can be seen that most have opted for the combination of hydroxy terminated PSU with other monomers, which on polymerization give block copolymers. In this process, it is quite likely that the polymerizing monomers would give block sizes so varied that some of the PSU blocks may be joined by nothing more than a single monomer unit having a molecular weight of only 300 or less, and certainly <1000. Thus, the molecular weight of the second block will not be that of a PSU oligomer, which should ideally be >1000 to be called a block. Thus, depending on the concentration, it is likely that the second homoblock will be no more than a single or double monomer unit. (sentence deleted)

Noshay and coworkers (J. Polymer Sci. A-1, 3147, 1971) have prepared block copolymers of amine terminated dimethyl Siloxanes and hydroxy terminated PSU. The hydroxy terminated PSU was prepared using a slight excess of Bisphenol A (0.495 mole) over DCDPS (0.450 mole). The —ONa groups were then converted to —OH groups using oxalic acid and the product was precipitated. The dried PSU powder was reacted with a separately prepared amine terminated polysiloxane in ether at 60° C. It may be noted that while PSU is plastic, Polysiloxane is elastomeric and hence the combination gives a block copolymer with thermoplastic elastomer like properties.

Surprisingly however, there has been no described method, nor synthesis carried out, whereby two Sulfone homoblocks have been used to form a block copolymer with thermoplastic properties.

The usual method of preparation of these polysulfones consists of the following process:

An aprotic organic solvent selected usually from Sulfolane, N-methyl pyrrolidone (NMP), Dimethyl Acetamide (DMAc), Diphenyl sulfone, Dimethyl sulfone or Dimethyl sulfoxide (DMSO), usually distilled over an alkali, is placed in the reactor. DCDPS or a similar dihalo monomer and the second dihydroxy monomer (Bisphenol A or Biphenol, etc.), generally in a molar proportion of 1.00:1.00, are added to this reactor along with sodium or potassium carbonate. Toluene or monochlorobenzene (MCB) is added to facilitate dehydration. The temperature of the mixture is then slowly increased from RT to 140° C. to 200° C. depending on the solvent utilized, whereupon the alkaline carbonate reacts with the phenol to give a salt and liberate water. The water gets distilled off, which is facilitated by toluene or MCB, if present.

The reaction mixture after water removal is then heated to a temperature in the range of 170° C. to 230° C., depending on the solvent, alkali and the dihydroxy monomer used, until the desired viscosity or molecular weight is attained. Thereafter, the growing chains are end-capped with MeCl and the reaction mass is filtered to remove salt. The polymer chains are then precipitated in water or MeOH, further treated to remove the residual solvent, and dried. Alternately, the solvent may be removed by flash evaporation and the reaction mass passed through a devolatizing extruder directly to remove residual solvent and for polymer granulation.

Adding more than one hydroxy monomer to the above leads to ter-polymers with three, instead of two, monomer units incorporated randomly in the chains.

It is desirable that a method of block copolymer formation is evolved whereby two plastics, both of which are sulfone-based oligomers, are connected to form a single chain as a block copolymer. As noted earlier, block copolymers comprising two or more different polysulfones are not known in the art.

In general, as is known in art, three requirements need to be met for the successful formation of block copolymers from homoblocks:
  i) The two homoblocks should have end groups that react with each other, i.e. —OH & —CNO.
  ii) Each homoblock should have identical end groups i.e. —OH or —CNO.
  iii) The two homoblocks should be mixed in exact stoichiometric proportions in order to obtain high molecular weights.

The present invention discloses a process of preparing block copolymers using two or more different polysulfones homoblocks and avoids the strict requirement that the individual homoblocks must have the same end groups. Similarly, it is not necessary for the two or more homoblocks used to be in equivalent stoichiometric proportions for high molecular weight block copolymer formation.

SUMMARY OF THE INVENTION

The present invention relates to a process for preparing block copolymers comprising at least two types of homoblock, all belonging to the polysulfone family, wherein each of the said homoblocks has an identical or different molecular weight of at least 1000 and comprising at least 5% of the overall weight of the block copolymer, and wherein the block copolymer has a molecular weight of at least 2000 and the process comprising the steps of:
  (a) preparing each of the aforesaid homoblocks by heating at least one aromatic diol with at least one aromatic dihalo compound, one of which contains at least one sulfone group, in the presence of at least one alkali, optionally in at least one solvent and further optionally in the presence of an azeotropic agent,
  (b) reacting the aforesaid homoblocks together optionally in at least one solvent, optionally followed by end-capping said block copolymer, and
  (c) recovering the block copolymer.

The present invention also relates to the block copolymers prepared using the aforesaid process.

The present invention describes the preparation of block copolymers of various types of polysulfones. These novel block copolymers are prepared using a technique whereby lower molecular weight homoblocks are first separately prepared and then mixed in different proportions and reacted further to give high molecular weight block copolymers. It becomes possible, using this technique, to ensure the formation of the block structures, as well as their sequences and the block molecular weights. Besides segmented multi-blocks copolymers, even high molecular weight di-blocks or tri-blocks as well as multi-blocks with known block molecular weights are feasible using this method. Block copolymers thus prepared find usage as novel polysulfone plastics, and also as compatibilizers.

DESCRIPTION OF THE INVENTION

In general, two possible chain end structures exist on a polymeric chain of a homoblock of a polysulfone. These end groups are —Cl, emanating from a dihalo, (i.e. DCDPS) moiety and —OH emanating from the Phenolic (i.e. Biphenol) monomer. A mixture of the both end groups is also possible for a given polymeric chain.

For block copolymers, one expects, based on prior art, that the one homoblock should have two —Cl end groups per chain and the second homoblock should have two —OH end groups per chain. Mixing and reacting them in a 1:1 ratio would then yield a high molecular weight block copolymer. However, since it is possible to have —Cl or —OH mixed end groups on both the homoblocks, the present invention shows that it is possible to do away with the stringent requirement stated earlier that each homoblock should have identical end groups and the two homoblocks must be mixed in a 1:1 ratio.

Polysulfones usually have some —Cl and some —OH end groups. The concentration of each is decided by two important factors: firstly the initial molar ratio of DCDPS to Phenolic monomer and secondly the molecular weight of the polymer, if the molar ratio is not strictly 1:1, that is allowed to build up. The ratio of the two monomers is a very important factor because, in order to build a very high molecular weight, the ratio must be kept closer to 1:1 on a molar basis. Usually, no monomer should be present in a concentration of more than approximately 1-2 mole % higher than the other monomer. Thus, the mole ratio generally remains within the range 1.02:1.00 to 1.00:1.02 to get high molecular weights. An increase in the concentration of any one monomer to a value outside of this range generally results in a disturbance in stoichiometry to such a substantial extent that the molecular weight of the copolymer does not get built up enough and most polymeric properties suffer, as they do not reach optimum values. However, for the preparation for oligomeric homoblocks, such a stringent stoichiometry is not necessary since high molecular weight build up is not required. Thus, for homoblock preparation, a monomer ratio as high as 1.15:1.00 has been employed successfully in the present invention. The monomer ratio range, as homoblocks, has thus been increased from 1.02:1.00 to 1.15:1.00, without sacrificing the molecular weights of the ultimate block copolymer.

The present invention relates to novel polysulfone block copolymer structures and the novel process by which their preparation takes place. In particular, this invention relates to the preparation of new types of block copolymers made using PSU, PES and PPSU and similar polysulfones and the novel methods of their preparation. The block copolymers may be made using at least two different types of polysulfones and may be made using more than two types of polysulfones.

The process of the present invention involves the preparation of novel block copolymers of the polysulfone family using solution polymerization techniques. These block copolymers are prepared using lower molecular weight, oligomeric homoblocks of, for example, Polyphenylene Sulfone (PPSU) and Polysulfone (PSU). The invention consists not only of novel block copolymers using the above mentioned homoblocks, but also of the process used for preparation of these novel block copolymers.

A major novel and unexpected aspect of the process of the present invention is that it can do away with the stringent requirements that the given homoblock should have only one type of end group and that the stoichiometry between the homoblocks used must be 1:1. Thus, the process of the present invention makes it possible to prepare high molecular weight block copolymers without having identical end groups on each homoblock and without the stoichiometry being closely controlled. The present invention therefore greatly simplifies the formation of block copolymers. Also, a broader range of block copolymer structures can be readily made using the same homoblocks compared to the earlier methods of segmented block copolymer preparation. Of course, using homoblocks with identical end groups in exact stoichiometric proportions does not harm the process in any way, but these are no longer preconditions for the build up of high molecular weight block copolymers.

This process means that, by controlling the end groups of the homoblocks, block copolymers in which the two homoblocks have a variety of molecular weights can be prepared. The block copolymer can also have a large range of molecular weights and ratios of one homoblock to the other, which was not easy or even not possible in other type of block copolymers discussed earlier.

The novel block copolymers are made by first using initially separately prepared lower molecular weight homoblocks with reactive chain end groups. By the term "homoblock", it is meant that each block has either a PSU, PPSU or PES or some such polysulfone structure and different homoblocks have structures differing from each other. The two homoblocks are separately prepared and are arranged to have two end groups which in turn are either the same or different. It is important to realize as taught by this invention that there should be, nevertheless, a near stoichiometric balance of the two differing end groups, in this case say —Cl and —OH. What is important is that both end groups are allowed to be present on both the homoblocks.

The different ways of preparing homoblocks are as follows:

The first set of homoblocks are prepared with predominantly halogen end groups, such as —F, —Cl, —Br and —I. The second set of homoblocks are prepared with predominantly the second type of end group such as —OH (which may be present as the salts —OK, —ONa, or —OLi), which is capable of reacting with a halogen end group. This is done by taking large molar excess of dihalo monomer as compared to the dihydroxy monomer in the first case and reversing this ratio in the second. In general, when the lower molecular weight homoblock having predominantly one type of end group is reacted with another homoblock having predominantly the second type of end group, block copolymers having high molecular weights are obtained. Thus, for example, reacting low molecular weight PPSU homoblock having predominantly —OH end groups with low molecular weight PSU homoblock having predominantly —Cl end groups gives novel block copolymers with [PPSU-PSU]z in the block copolymer sequence. When one homoblock has predominantly all the same end groups (—Cl for example) and is reacted with a second homoblock having predominantly all of a second type of end groups (—OH for example), the block copolymer obtained has blocks of similar molecular weights to the homoblocks. The present invention makes it possible for the molecular weights of the homoblocks inside the block copolymer to be nearly same as the molecular weights of the homoblocks used to prepare it.

It is also possible to prepare, according to this invention, block copolymers where the homoblock of PPSU has halogen end groups and the PSU homoblock has phenolic —OH end groups, as well as the reverse case, where PPSU has the hydroxy end groups and PSU has the halogen end groups. As shown by this invention, the end groups may be interchangeable for a given homoblock. Where each homoblocks has identical end groups (—Cl and —OH for example), it is important to have them in stoichiometric proportions. In case of making one or both high molecular weight homoblocks, it is important to keep end groups of both different to the extent possible, as in the case of di-blocks and tri-blocks preparations.

It is, however, possible according to this invention for both homoblocks to have both end groups and still being used for making high molecular weight block copolymers. This can be done by taking both monomers in near equal molar ratio. In such cases, the end groups will be halogen and hydroxy, irrespective of molecular weights. Thus, using the above example, it is possible to make PPSU and PSU homoblocks both having —Cl and —OH end groups and to react them together to form block copolymers of a desired molecular weight. In such cases, the block copolymers formed may have blocks having in-chain molecular weight that is similar or higher than the molecular weights of the parent homoblocks.

This invention also teaches that besides random homoblock sequence in the block copolymer thus prepared, one can also make di- and tri-block copolymers by adjusting the molecular weights of the homoblocks and the stoichiometry of the two homoblocks reacted to form the block copolymers.

The invention therefore teaches the preparation of diblock, tri-block as well as segmented block copolymers where the homoblocks may alternate or be present in a random sequence.

If the molecular weights of the homoblocks are kept low enough and end groups are carefully controlled, this invention makes it possible to build high molecular weight copolymers having essentially alternate homoblock structures in the chains. In such block copolymers all the blocks will have similar molecular weights to those of the two initial homoblocks. If the molecular weights of the homoblocks are kept high, then one can build di- and tri-block copolymers of relatively high molecular weights.

It is also another important part of this invention as given above that z, degree of block copolymerization, can be varied from as low as 1 (for a di-block) to as high as 100 or higher for an alternate or random multi block copolymer.

It is also another important part of this invention that special tri-block copolymers can also be prepared by using judicious control of the molecular weight, stoichiometry and end groups of the homoblocks.

The novel aspect of this invention is the recognition that by varying the stoichiometry of the basic monomers that are used for the preparation of homoblocks, particularly when they are of lower molecular weights, one can make these homoblocks with predominantly known end groups. Thus using one monomer, say, DCDPS in an excess of, say, 3 mole % over Biphenol i.e. a molar stoichiometry of >1.03:1.00, one obtains PPSU with essentially only —Cl as end groups. This is due to the fact that higher concentrations of DCDPS lead to essentially complete reaction of all of the —OH groups present on Biphenol, thereby limiting the molecular weight build up but providing essentially only —Cl end groups for the homoblock PPSU. Similarly, when Bisphenol A is used at higher concentration in PSU production, one gets essentially all end groups as —OH, as its Na or K salt. PSU, having essentially these phenolic groups, will not react with itself to give higher molecular weights PSU. Similarly, PPSU with —Cl end groups also cannot react with itself to give higher molecular weight PPSU. Under such conditions, the molecular weight does not increase further, indicating that the chains with the other end groups have all reacted.

However, when a homoblock of PPSU with essentially all —Cl end groups is mixed with a homoblock of PSU with essentially all —OK end groups, further polymerization occurs and a PSU-PPSU block is generated. Allowing this reaction to proceed further results in random block copolymer formation with a structure of the type [PSU-PPSU-]z, where z is greater than or equal to 1, and is dependant on the molecular weights of homoblocks, and the stoichiometry and the molecular weight that is allowed to be built up.

One important aspect of this invention is deliberate use of higher ratios of the two monomers for the preparation of homoblocks to give essentially one type of end groups. The ratio may be 1.03-1.15:1.00 that is having 3 to 15 mole % higher quantity of one monomer over the second monomer.

Another important aspect of this invention is that the homoblocks can also be conveniently prepared using near equal stoichiometry of the two base monomers, keeping the molecular weights of the homoblocks as desired and, by mixing, preparing high molecular weight block copolymers of the desired composition.

The important aspect of this invention is therefore the preparation of lower molecular weight homoblocks with known end groups and their mixing in the right proportions to yield essentially alternating or random block sequence in block copolymers of higher molecular weights.

A further novel and important aspect of this invention is the preparation of di- and tri-block copolymers. These di- and tri-block copolymers are also materials of a novel composition. For this preparation, it is again recognized that homoblocks can be prepared with different molecular weights with essentially known end groups. In general, by recognizing that controlling the molecular weights of the homoblocks and the block copolymers can give good control of the number of homoblocks present in the block copolymer, one can stop the reaction at di or tri block stage. Polysulfones of sufficiently high molecular weight or inherent viscosity, (Inh. V.) are required to give optimum mechanical and other polymer properties, one can build that range of molecular weight homoblocks. Thus, PPSU of a number average molecular weight (Mn) of say 50000 with —Cl end groups and PSU of say similar molecular weight with —OK end groups, when mixed and reacted in a proportion of 1:1 on a molar basis will give almost double the molecular weight, giving a di-block. The molecular weight can be controlled on-line using gel permeation chromatography (GPC).

If di-blocks are allowed to react further to give still higher molecular weight, we get a tri- and tetra-block and so on. Thus, di-blocks of the structure -[-PSU-PPSU-]- will further react to give tri-blocks of the structure -[-PSU-PPSU-PSU-]- and -[PPSU-PSU-PPSU-]- and which, on further reaction, will yield tetra-blocks and higher multi-blocks.

Thus, by controlling molecular weight, stoichiometry and end groups, this invention makes it possible to prepare di-block and tri-block and multi-block copolymers of PSU and PPSU.

This invention further makes it possible to prepare a tri-block using three different types of homoblocks as follows. First a di-block is prepared using two homoblocks, where the two end groups present on one homoblock are the same and similarly the second homoblock has two identical end groups on its chains, but different to those on the first homoblock. This di-block is reacted with a third homoblock having two end groups similar to either the first or the second homoblock to give a tri-block.

The block polymers thus produced may be checked for GPC molecular weight, Inh. V., DSC, Tg, MFI, etc. for quality control. The block copolymers may be used as powder for compounding and subsequently for granulation or may be added as a compatibilizer to the already separately manufactured high molecular weight homologue polysulfones.

The present invention seeks to achieve the following:

to provide novel block copolymers of two or more different polysulfone homoblocks, with controlled structures of di-blocks, tri-blocks and multi-blocks.

to use these homoblocks of polysulfones having low molecular weight and controlled chain end groups to prepare high molecular weight block copolymers.

to prepare high molecular weight di-block and tri-block copolymers using the homoblocks of lower molecular weight and reactive chain ends.

to prepare two types of homoblocks each essentially having either only halogen or hydroxy end groups and thus giving a multi-block copolymer on reaction between the two, the blocks present in block copolymer with molecular weight being similar to the initial homoblock molecular weight.

to prepare block copolymers of two polysulfones, where the ratio of the two homoblocks is in the range 95:5 to 5:95.

to prepare block copolymers of two or more homoblocks of polysulfones, which are transparent and which show a single intermediate Tg.

to prepare block copolymers that are thermally stable and processible in the temperature range of 350° C. to 400° C., using traditional injection molding, extrusion or other acceptable plastics processing methods.

to provide a process by which the homoblocks of polysulfones of known molecular weights and controlled end groups are prepared.

to provide a process for the preparation of low molecular weight controlled chain end homoblocks and another process for the preparation of high molecular weight block copolymers having di/tri/multi-block in-chain structures.

According to this invention there is provided a process that allows one to prepare low molecular weight, controlled chain-end homoblocks and utilize these homoblocks to prepare di-, tri-, and multi-block copolymers of high molecular weight.

The invention preferably uses Sulfolane, NMP, DMAc, DMSO, DMSO2, Diphenyl sulfone or any other aprotic organic solvent for the preparation of low molecular weight homoblocks and the high molecular weight block copolymers thereof.

Preferably MCB or Toluene or any other non-reacting solvent is used as a diluent and dehydrating agent for the salt formation, dehydration and polymerization steps.

Preferably the process uses the above mentioned solvent in the temperature range of 120° C. to 250° C. and with alkali such as NaOH, KOH, NaHCO$_3$, KHCO$_3$, Na$_2$CO$_3$ or K$_2$CO$_3$ either by themselves or in a combination of these or any other such suitable alkaline substances.

According to this invention there is provided a process of producing novel homoblocks and multi-block copolymers, using an aprotic organic solvent or solvents in the temperature range of 120° C.-250° C. and then end capping with MeCl or any suitable end capping agent. The process includes the preferred steps of filtration of the salt and precipitation of the block copolymer from the reaction mixture in a non-solvent like H$_2$O or MeOH or a mixture of the two, and then giving further water/or MeOH treatments to reduce the residual solvent content of the powder and subsequently drying the polymeric powder.

The present invention will now be described with reference to the following examples. The specific examples illustrating the invention should not be construed to limit the scope thereof.

EXAMPLES

Example 1

A Block-Copolymer of 50:50 PPSU:PSU (B-0)

The following three part procedure was used to prepare this PPSU-PSU block copolymer.

Part 1: The Preparation of the PPSU Homoblock

A 4-necked, 3-litre glass flask was equipped with an overhead stirrer attached to a stainless steel paddle through its center neck. Through one of its side necks, a Cloisonné adapter was attached. The other neck of the Cloisonné adapter was attached to a Dean-Stark trap and a water-cooled condenser. A thermocouple thermometer was inserted through another of the side necks. A nitrogen gas inlet was inserted through the other side neck. The flask was placed in an oil bath, which was connected to a temperature controller.

Dimethyl acetamide (DMAc) (873 gms, 950 ml/mole) and toluene (344 gms, 400 ml/mole) were placed in the flask and heated to 45° C. Biphenol (186 gms) and 4,4'-dichlorodiphenyl sulfone (DCDPS) (307 gms) were added to the flask, the DCDPS and biphenol being in a molar ratio of 1.07:1.00, and the reactants were stirred for 30 minutes. Anhydrous potassium carbonate (152 gms) and sodium carbonate (21 gms) were added to the flask. A nitrogen atmosphere was maintained in the flask by purging. The temperature of the reactants was slowly increased to 165° C. over 9 hours and the stirring speed set to 400 rpm. The water formed due to the reaction of $K_2CO_3$ with biphenol was distilled over as an azeotrope with toluene and collected in the Dean-Stark trap. The toluene was then returned to the reaction mixture once it had been separated from the water. Once the water had been completely removed, toluene addition back to reaction vessel was stopped. The toluene was then removed completely from the reaction mixture as the temperature of the reactants increased. The desired temperature was reached after 9 hours. The reaction temperature was then maintained at 165° C. and when the viscosity started to increase the stirring speed was raised to 500 rpm. Once the viscosity increase slowed, a sample was taken out to check the molecular weight. The GPC Mn achieved was about 32,000, with a Mw of 43,000 and a MWD of 1.34. The reaction mixture was allowed to cool in preparation for its reaction with the product of part 2. The relatively high molar ratio of DCDPS to Biphenol gave PPSU of a relatively low molecular weight and with predominantly end groups of —Ph—Cl.

Part 2: The Preparation of the PSU Homoblock

DMAc (873 gms, 950 ml/mole) and toluene (400 ml/mole) were placed in the flask, through which nitrogen gas was bubbled continuously, and heated to 45° C. Bisphenol A (244 gms) and 4,4'-dichlorodiphenyl sulfone (DCDPS) (287 gms) were added to the flask, the Bisphenol A and DCDPS being in a molar ratio of 1.07:1.00, and the reaction mixture was stirred for 30 minutes. Anhydrous potassium carbonate (170 gms) was added. The toluene acts as an azeotropic solvent. The temperature of the reactants was slowly increased to 165° C. over 9 hours and the stirring speed was set to 400 rpm. The water formed due to the reaction was distilled over as an azeotrope with toluene and collected in the Dean-Stark trap. The toluene was then returned to the reaction mixture once it had been separated from the water. Once the water had been completely removed, toluene addition back to the reaction vessel was stopped. The toluene was then removed completely from the reaction mixture as the temperature of the reactants increased. The desired temperature was reached after 9 hours. The reaction temperature was then maintained at 165° C. and when the viscosity started to increase the stirring speed was raised to 500 rpm. At the required Mn of 17,000, MW of about 26,000 and MWD 1.5 the viscosity of the reaction mixture remained almost constant, indicating the end of the polymerization reaction.

Part 3: The Preparation of the Block Copolymer

The reaction mixtures of Part 1 and Part 2 were mixed in equal proportions by weight and the block polymerization was conducted at 165° C. After the required MW was achieved, as shown by GPC, the reaction mixture was quenched with DMAc (376 gms, 400 ml/mole) and its temperature reduced to 160° C. Methyl Chloride gas was then bubbled through the reaction mixture for 5 hrs to ensure complete end capping. The reaction mixture was then diluted with DMAc (600 ml/mole) for a second time. The polymer solution was filtered through a 15 micron filter in a pressure filter funnel using 2 kg/cm² of nitrogen to remove any salts. The block copolymer was finally recovered by slowly adding the salt-free polymer solution to de-ionized water (13 ml/gm of polymer) under high-speed agitation. The precipitated polymer was then recovered by filtration. The precipitated polymer was ground and refluxed three times with de-ionized water at 90° C. to completely remove all salts and DMAc. The precipitated polymer was then filtered and dried in an oven at 140° C. until the moisture content as determined by Karl Fischer titration was <0.5%.

GPC analysis of the block copolymer showed an Mn of 94,000, an Mw of 135,000 and an MWD of 1.44 based on the polystyrene standards. Thus, the copolymer produced had a significantly higher molecular weight than the two homoblocks used as monomer units, indicating the preparation of a block copolymer. The block copolymer powder was then mixed with 0.3% heat stabilizer and 0.2% Ca stearate and granulated using a twin screw extruder. The Tg and the specific gravity of PSU are 189° C. and 1.235 respectively, whilst those of PPSU are 222° C. and 1.290. The transparent granules of block copolymer showed a DSC Tg of 206° C. and a specific gravity of 1.260. The transparency of the granules, the single GPC peak, the intermediate Tg and the specific gravity of the product clearly indicate that a block-copolymer of PSU and PPSU had indeed been formed and that the product was not simply a blend of the two homopolymers, PSU and PPSU. The remaining properties and also those of the blends are given in Table 1.

Example 2

A Block-Copolymer of 75:25 PPSU:PSU (B-1)

An experimental set up similar to that described in Example 1 was used.

Part 1: The Preparation of the PPSU Homoblock

DMAc (2679 gms, 950 ml/mole) and toluene (1032 gms, 400 ml/mole) were placed in the flask, through which nitrogen gas was bubbled continuously, and heated to 45° C. Biphenol (558 gms) and 4,4'-dichlorodiphenyl sulfone (DCDPS) (921 gms) were added to the flask, the DCDPS and biphenol being in a molar ratio of 1.07:1.00, and the reactants were stirred for 30 minutes. Anhydrous potassium carbonate (455 gms) and sodium carbonate (64 gms) were added to the flask. The toluene acts as an azeotropic solvent.

The rest of the procedure is the same as that described in Part 1 of Example 1. The homoblock obtained had a GPC molecular weight of Mn 16,000, an Mw of 25,000 and an MWD of 1.52.

Part 2: The Preparation of the PSU Homoblock

Dimethyl Acetamide (DMAc) (893 gms, 950 ml/mole) and Toluene (344 gms, 400 ml/mole) were placed in the flask, through which nitrogen gas was bubbled continuously, and heated to 45° C. Bisphenol A (244 Gms) and 4,4'-dichlorodiphenyl sulfone (DCDPS) (287 gms) were added to the flask, the Bisphenol A and DCDPS being in a molar ratio of 1.07:1.00, and the reaction mixture was stirred for 30 minutes. Anhydrous potassium carbonate (170 gms) was added to the flask. The toluene acts as an azeotropic solvent.

The rest of the procedure is the same as that described in Part 2 of Example 1. The homoblock obtained had a GPC molecular weight of Mn 14,000, an Mw of 21,000 and an MWD of 1.49.

Part 3: The Preparation of the Block Copolymer

The reaction mixtures of Part 1 (3 parts) and Part 2 (1 Part) were mixed together and the block polymerization was conducted at 165° C. After the required GPC MW was achieved, the reaction mixture was quenched with DMAc (344 gms, 400 ml/mole) and its temperature reduced to 160° C. Methyl Chloride gas was then bubbled through the reaction mixture for 5 hrs to ensure complete end capping. The reaction mixture was then diluted with DMAc (600 ml/mole) for a second time. The polymer solution was passed through a 15 micron filter in a pressure filter funnel using 2 kg/cm$^2$ nitrogen to remove any salts. The block copolymer was finally recovered by slowly adding the salt-free polymer solution to de-ionized water (13 ml/gm of polymer) under high-speed agitation. The precipitated polymer was then recovered by filtration. The precipitated polymer was treated three times with refluxing de-ionized water at 90° C. The precipitated polymer was then filtered and dried in oven at 140° C. until the moisture content as determined by Karl Fisher titration was <0.5%.

GPC analysis of the block copolymer showed an Mn of 83,000, an Mw of 119,000 and an MWD of 1.44 based on the polystyrene standards. The block copolymer was then granulated as in Example 1 and its properties were measured. These were a Tg of 210° C. and a specific gravity of 1.27. This data, and the product being obtained as clear transparent granules, indicated that PPSU and PSU were present as a block copolymer and not simply as a blend of the two homopolymers. The remaining properties and also those of the blend of similar proportions are given in Table 1.

Example 3

A Block Copolymer of 25:75 PPSU:PSU (B 2)

An experimental set up similar to that described in Example 1 was used.

Part 1: The Preparation of the PPSU Homoblock

DMAc (893 gms, 950 ml/mole) and toluene (344 gms, 400 ml/mole) were placed in the flask, through which nitrogen gas was bubbled continuously, and heated to 45° C. Biphenol (199 gms) and DCDPS (287 gms) were added to the flask, the DCDPS and biphenol being in a molar ratio of 1.00:1.07, and the reactants were stirred for 30 minutes. Anhydrous potassium carbonate (162 gms, 1.10 mole/mole) and sodium carbonate (23 gms) were then added to the flask.

The rest of the procedure is same as that described in Part 1 of Example 1. The homoblock obtained had a GPC molecular weight of Mn 17,000, an Mw of 30,000 and an MWD of 1.70 based on the polystyrene standards.

Part 2: The Preparation of the PSU Homoblock

DMAc (2679 gms, 950 ml/mole) and toluene (1032 gms 400 ml/mole) were placed in the flask, through which nitrogen gas was bubbled continuously, and heated to 45° C. Bisphenol A (226 ms) and DCDPS (921 gms) were added to the flask, the Bisphenol A and DCDPS being in a molar ratio of 1.00:1.07, and the reaction mixture was stirred for 30 minutes. Anhydrous potassium carbonate (486 gms) was then added to the flask.

The rest of the procedure is same as that described in Part 2 of Example 1. The homoblock obtained had a GPC molecular weight of Mn 14,000, an Mw of 21,000 and an MWD of 1.49 based on the polystyrene standards.

Part 3: The Preparation of the Block Copolymer

The reaction mixtures of Part 1 (1 part) and Part 2 (3 parts) were mixed together and the block polymerization was conducted at 165° C. After the required GPC MW was achieved, the reaction mixture was quenched and the copolymer worked up as in Example 1.

GPC analysis of the copolymer showed an Mn of 79,000, an Mw of 114,000 and an MWD of 1.44. The block copolymer powder was then extruded and granulated as per the procedure given in Example 1. The DSC Tg of the copolymer was 195° C. and the specific gravity was 1.24. This data, and the product being obtained as light amber colored transparent granules, indicated that the polymer obtained was indeed a block copolymer and not simply a blend of PPSU and PSU. The remaining properties and also those of the blends are given in Table 1.

Example 4

A Copolymer of 90:10 PPSU:PSU (B 3)

An experimental set up similar to that described in Example 1 was used.

Part 1: The Preparation of the PPSU Homoblock

DMAc (3215 gms, 950 ml/mole) and toluene (1238 gms, 400 ml/mole) were placed in the flask, through which nitrogen gas was bubbled continuously, and heated to 45° C. Biphenol (670 gms) and 4,4'-dichlorodiphenyl sulfone (DCDPS) (1075 gms), were added to the flask, the DCDPS and biphenol being in a molar ratio of 1.04:1.00, and the reactants were stirred for 30 minutes. Anhydrous potassium carbonate (546 gms) and sodium carbonate (76 gms) were added to the flask. The toluene acts as an azeotropic solvent.

The rest of the procedure is the same as that described in Part 1 of Example 1. The homoblock obtained had a GPC molecular weight of Mn 22,000, an Mw of 26,000 and an MWD of 1.16.

Part 2: The Preparation of the PSU Homoblock

DMAc (357 gms, 950 ml/mole) and Toluene (138 gms 400 ml/mole) were placed in the flask, through which nitrogen gas was bubbled continuously, and heated to 45° C. Bisphenol A (96 gms) and DCDPS (115 gms) were added to the flask, the Bisphenol A and DCDPS being in a molar ratio of 1.05:1.00, and the reaction mixture was stirred for 30 minutes. Anhydrous potassium carbonate (64 gms) was added to the flask. The toluene acts as an azeotropic solvent. The reaction vessel was evacuated using a vacuum pump and filled with nitrogen.

The rest of the procedure is the same as that described in Part 2 of Example 1. The homoblock obtained had a GPC molecular weight of Mn 18,000, an Mw of 29,000 and an MWD of 1.62

Part 3: The Preparation of the Block Copolymer

The reaction mixtures of Part 1 (9 parts) and Part 2 (1 Part) were mixed together and the block polymerization conducted at 165° C. After the required GPC MW was achieved, the reaction mixture was quenched with DMAc (376 gms, 400 ml/mole) and its temperature reduced to 160° C. Methyl Chloride gas was then bubbled through the reaction mixture for 5 hrs to ensure complete end capping. The reaction mixture was then diluted with DMAc (564 gms, 600 ml/mole) for a second time. The polymer solution was passed through a 15 micron filter in a pressure filter funnel using 2 kg/cm$^2$ nitrogen to remove any salts. The block copolymer was finally recovered by slowly adding the salt-free polymer solution to de-ionized water (13 ml/gm of polymer) under high-speed agitation. The precipitated polymer was recovered by filtration. The precipitated polymer was treated three times with refluxing de-ionized water at 90° C. The precipitated polymer was then filtered and dried in an oven at 140° C. until the moisture content as determined by Karl Fisher titration was <0.5%.

GPC analysis of the copolymer showed an Mn of 80,000, an Mw of 110,000 and an MWD of 1.36 based on polystyrene standards. The block copolymer was then granulated as in Example 1 and its properties were measured. These were a Tg of 215° C. and a specific gravity of 1.28. This data, and the product being obtained as clear transparent granules, indicated that PPSU and PSU were indeed present as a block copolymer and not just as a blend of the two homopolymers. The remaining properties and also those of the blends are given in Table 1.

Example 5

Physical Blends of PPSU and PSU

In order to study the properties of the physical blending of PPSU and PSU dry blending of the powders was carried out in the following proportions, followed by extrusion on ZE25 twin screw extruder and evaluation (Table 1).

| | |
|---|---|
| C1: | PPSU powder (50%) + PSU powder (50%) |
| C2: | PPSU powder (75%) + PSU Powder (25%) |
| C3: | PPSU powder (25%) + PSU powder (75%) |

The PPSU used was the commercially available GAFONE-P 4300 grade and the PSU used was the commercially available GAFONE-S PSU 1300, both from Gharda Chemicals Ltd. India.

Example 6

Copolymer of 90:10 of PPSU-PSU (B 4)

An experimental set up similar to that described in Example 1 was used.

Part 1: The Preparation of the PPSU Homoblock

DMAc (8037 gms, 950 ml/mole) and toluene (3096 gms, 400 ml/mole) were placed in the flask, through which nitrogen gas was bubbled continuously, and heated to 45° C. Biphenol (1674 gms) and 4,4'-dichlorodiphenyl sulfone (DCDPS) (2635 gms), were added to the flask, the DCDPS and biphenol being in a molar ratio of 1.02:1.00, and the reactants were stirred for 30 minutes. Anhydrous potassium carbonate (1366 gms) and anhydrous sodium carbonate (191 gms) were added to the flask. The toluene acts as an azeotropic solvent.

The rest of the procedure is the same as that described in Part 1 of Example 1. The homoblock obtained had a GPC molecular weight of Mn 17,000, an Mw of 26,000 and an MWD of 1.54.

Part 2: The Preparation of the PSU Homoblock

DMAc (893 gms, 950 ml/mole) and toluene (344 gms 400 ml/mole) were placed in the flask, through which nitrogen gas was bubbled continuously, and heated to 45° C. Bisphenol A (239 gms) and 4,4'-dichlorodiphenyl sulfone (DCDPS) (287 gms) were added to the flask, the Bisphenol A and DCDPS being in a molar ratio of 1.05:1.00, and the reaction mixture was stirred for 30 minutes. Anhydrous potassium carbonate (167 gms) was added to the flask. The toluene acts as an azeotropic solvent.

The rest of the procedure is the same as that described in Part 2 of Example 1. The homoblock obtained had a GPC molecular weight of Mn 10,000, an Mw of 15,000 and an MWD of 1.50/

Part 3: The Preparation of the Block Copolymer

The reaction mixtures of Part 1 (9 parts) and Part 2 (1 Part) were mixed together and the block polymerization was conducted at 165° C. After the required GPC MW was achieved, the reaction mixture was quenched with DMAc (376 gms, 400 ml/mole) and its temperature reduced to 160° C. Methyl Chloride gas was then bubbled through the reaction mixture for 5 hrs to ensure complete end capping. The reaction mixture was then diluted with DMAc (564 gms, 600 ml/mole) for the second time. The polymer solution was passed through a 15 micron filter in a pressure filter funnel using 2 kg/cm$^2$ nitrogen to remove any salts. The block copolymer was finally recovered by slowly adding the salt-free polymer solution to de-ionized water (13 ml/gm of polymer) under high-speed agitation. The precipitated polymer was recovered by filtration. The precipitated polymer was treated three times with refluxing de-ionized water at 90° C. The precipitated polymer was then filtered and dried in an oven at 140° C., until the moisture content as determined by Karl Fisher titration was <0.5%.

GPC analysis of the block copolymer showed an Mn of 80,000, an Mw of 115,000 and an MWD of 1.44 based on polystyrene standards. The block copolymer was then granulated as in Example 1 and its properties were measured. These were a Tg of 216° C. and a specific gravity of 1.28. This data, and the product being obtained as clear transparent granules, indicated that PPSU and PSU were indeed present as a block copolymer and not simply as a blend of the two homopolymers. The remaining properties and also those of the blends are given in Table 2.

Example 7

A Block Copolymer of 90:10 PPSU:PSU (B 5)

An experimental set up similar to that described in Example 1 was used.

Part 1: The Preparation of the PPSU Homoblock

DMAc (8037 gms, 950 ml/mole) and toluene (3096 gms, 400 ml/mole) were placed in the flask, through which nitrogen gas was bubbled continuously, and heated to 45° C. Biphenol (1674 gms) and 4,4'-dichlorodiphenyl sulfone (DCDPS) (2816 gms) were added to the flask, the DCDPS and biphenol being in a molar ratio of 1.09:1.00, and the reactants were stirred for 30 minutes. Anhydrous potassium carbonate (1366 gms) and anhydrous sodium carbonate (191 gms) were added to the flask. The toluene acts as an azeotropic solvent.

The rest of the procedure is the same as that described in Part 1 of Example 1. The homoblock obtained had GPC molecular weights of Mn 42,000, an Mw of 55,000 and an MWD of 1.31.

Part 2: Preparation of the PSU Homoblock

DMAc (893 gms, 950 ml/mole) and toluene (344 gms 400 ml/mole) were placed in the flask, through which nitrogen gas was bubbled continuously, and heated to 45° C. Bisphenol A (244 gms) and 4,4'-dichlorodiphenyl sulfone (DCDPS) (287 gms), were added to the flask, the Bisphenol A and DCDPS being in a molar ratio of 1.07:1.00, and the reaction mixture was stirred for 30 minutes. Anhydrous potassium carbonate (170 gms) was added to the flask. The toluene acts as an azeotropic solvent.

The rest of the procedure is the same as that described in Part 2 of Example 1. The homoblock obtained had GPC molecular weights of Mn 18,000, an Mw of 24,000 and an MWD of 1.34.

Part 3: The Preparation of the Block Copolymer

The reaction mixtures of Part 1 (9 parts) and Part 2 (1 Part) were mixed together and the block polymerization was conducted at 165° C. An insufficient viscosity rise took place during the polymerization. The GPC analysis showed an Mn of 48,000, an Mw of 67,000 and an MWD of 1.39, so an extra 0.04 mole/mole of biphenol was added and the polymerization was continued. After the required GPC MW was achieved, the reaction mixture was quenched with DMAc (376 gms, 400 ml/mole) and its temperature reduced to 160° C. Methyl Chloride gas was then bubbled through the reaction mixture for 5 hrs to ensure complete end capping. The reaction mixture was then diluted with DMAc (564 gms, 600 ml/mole) for a second time. The polymer solution was passed through a 15 micron filter in a pressure filter funnel using 2 kg/cm$^2$ nitrogen to remove any salts. The block copolymer was finally recovered by slowly adding the salt-free polymer solution to de-ionized water (13 ml/gm of polymer) under high-speed agitation. The precipitated polymer was then recovered by filtration. The precipitated polymer was treated three times with refluxing de-ionized water at 90° C. The precipitated polymer was then filtered and dried in an oven at 140° C. until the moisture content as determined by Karl Fisher titration was <0.5%.

GPC analysis of the copolymer showed an Mn of 93,000, an Mw of 132,000 and an MWD of 1.41 based on polystyrene standards. The block copolymer was then granulated as in Example 1 and its properties were measured. These were a Tg of 219° C. and a specific gravity of 1.28. This data, and the product being obtained as clear transparent granules, indicated that PPSU and PSU were indeed present as a block copolymer and not simply as a blend of the two homopolymers. The remaining properties and also those of the blends are given in Table 2.

Example 8

A Block Copolymer of 80:20 PPSU:PSU (B 6)

An experimental set up similar to that described in Example 1 was used.

Part 1: The Preparation of the PPSU Homoblock

DMAc (7144 gms, 950 ml/mole) and toluene (2752 gms, 400 ml/mole) were placed in the flask, through which nitrogen gas was bubbled continuously, and heated to 45° C. Biphenol (1488 gms) and 4,4'-dichlorodiphenyl sulfone (DCDPS) (2503 gms) were added to the flask, the DCDPS and biphenol being in a molar ratio of 1.09:1.00, and the reactants were stirred for 30 minutes. Anhydrous potassium carbonate (1215 gms) and anhydrous sodium carbonate (170 gms) were added to the flask. The toluene acts as an azeotropic solvent.

The rest of the procedure is the same as that described in Part 1 of Example 1. The homoblock obtained had GPC molecular weights of Mn 42,000, an Mw of 53,000 and an MWD of 1.25.

Part 2: The Preparation of the PSU Homoblock

DMAc (1786 gms, 950 ml/mole) and toluene (688 gms 400 ml/mole) were placed in the flask, through which nitrogen gas was bubbled continuously, and heated to 45° C. Bisphenol A (524 gms) and 4,4'-dichlorodiphenyl sulfone (DCDPS) (574 gms), were added to the flask, the Bisphenol A and DCDPS being in a molar ratio of 1.15:1.00, and the reaction mixture was stirred for 30 minutes. Anhydrous potassium carbonate (365 gms) was added to the flask. The toluene acts as an azeotropic solvent.

The rest of the procedure is the same as that described in Part 2 of Example 1. The homoblock obtained had GPC molecular weights of Mn 17,000, an Mw of 23,000 and an MWD of 1.33

Part 3: The Preparation of the Block Copolymer

The reaction mixtures of Part 1 (8 parts) and Part 2 (2 Part) were mixed together and the polymerization was conducted at 165° C. When the GPC molecular weight showed an Mw of 94,000. The reaction mass was quenched with DMAc (376 gms, 400 ml/mole) and its temperature reduced to 160° C. Methyl Chloride gas was then bubbled through the reaction mixture for 5 hrs to ensure complete end capping. The reaction mixture was then diluted with DMAc (564 gms, 600 ml/mole) for a second time. The polymer solution was passed through a 15 micron filter in a pressure filter funnel using 2 kg/cm$^2$ nitrogen to remove any salts. The block copolymer was finally recovered by slowly adding the salt-free polymer solution to de-ionized water (13 ml/gm of polymer) under high-speed agitation. The precipitated polymer was then recovered by filtration. The precipitated polymer was treated three times with refluxing de-ionized water at 90° C. The precipitated polymer was then filtered and dried in an oven at 140° C. until the moisture content as determined by Karl Fisher titration was <0.5%.

GPC analysis of the copolymer showed an Mn of 68,000, an Mw of 96,000 and an MWD of 1.40 based on Polystyrene standards. The block copolymer was then granulated as in Example 1 and its properties were measured. These were a Tg of 210° C. and a specific gravity of 1.27. This data, and the product being obtained as clear transparent granules, indicated that PPSU and PSU were indeed present as a block copolymer and not simply as a blend of the two homopolymers. The remaining properties and also those of the blends are given in Table 2.

Example 9

The Solubility of a Block Copolymer of 90:10 PPSU:PSU

Polyphenylene sulfone (PPSU) is insoluble in tetrahydrofuran (THF) at 65° C., whereas polyether sulfone (PSU) is soluble. The 90:10 PPSU:PSU block copolymer was only 0.64% soluble in ThF, clearly indicating its block structure.

The other block copolymers of PPSU-PSU (B-0, B-1 and B-2) were also soluble in THF.

Example 10

The Hydrolytic Stability of a Block Copolymer

Samples of the PPSU-PSU block copolymer from Example No. 6 were kept in boiling water at 100° C. for 7 days. The tensile properties of the samples were measured before and after their boiling in water and the results are shown below:

| Tensile properties | before boiling in water | after boiling in water |
|---|---|---|
| Tensile Strength(Mpa) | 73 | 70 |
| Tensile Modulus(Mpa) | 1915 | 1900 |
| Elongation at break(%) | 69 | 70 |

This data indicates that there is no drop in the tensile strength of the block copolymer after being stored in boiling water for 7 days and hence it can find applications where hydrolytic stability is important.

In the following Tables 1 and 2 the abbreviations used have the following meanings:—

The higher impact properties, one intermediate Tg and transparency of granules indicate that B0, B1, B2 & B3 are block copolymers and not just physical mixtures like C1, C2 & C3.

TABLE 1

PROPERTIES COMPARISION OF PPSU-PSU COPOLYMERS WITH NEAT PPSU & NEAT PSU & THEIR BLENDS:

| PROPERTY | PPSU | PSU | C-1 PPSU = 75% PSU = 25% | C-2 PPSU = 50% PSU = 50% | C-3 PPSU = 25% PSU = 75% | B-0 PPSU = 50% PSU = 50% | B-1 PPSU = 75% PSU = 25% | B-2 PPSU = 25% PSU = 75% | B-3 PPSU = 90% PSU = 10% |
|---|---|---|---|---|---|---|---|---|---|
| Mn | 80 | 90 | 85 | 94 | 97 | 94 | 83 | 79 | 80 |
| Mw | 111 | 129 | 122 | 131 | 135 | 135 | 119 | 114 | 110 |
| MWD | 1.39 | 1.44 | 1.43 | 1.39 | 1.39 | 1.44 | 1.40 | 1.44 | 1.36 |
| SPECIFIC GRAVITY | 1.290 | 1.235 | 1.277 | 1.259 | 1.248 | 1.26 | 1.27 | 1.248 | 1.28 |
| TENSILE STRENGTH (Mpa) | 74 | 76 | 75 | 78 | 76 | 74 | 75 | 76 | 76 |
| TENSILE MODULUS (Mpa) | 2500 | 2300 | 2195 | 2400 | 2304 | 2175 | 2252 | 2501 | 2281 |
| ELONGATION @ BRECK % | >80 | >80 | 68 | ? | 60 | 36 | 48 | 44 | 59 |
| IMPACT STRENGTH (J/M) | 650 | 45 | 117 | 76 | 61 | 97 | 94 | 61 | 160 |
| FLEXURAL STRENGTH (Mpa) | 100 | 114 | 104 | 108 | 105 | 110 | 111 | 113 | 99 |
| FLEXURAL MODULUS (Mpa) | 2200 | 2455 | 2323 | 2439 | 2228 | 2478 | 2402 | 2518 | 2293 |
| YIELD STRESS (%) | 8 | 7 | 8 | 8 | 8 | 7.3 | 8.0 | 7.4 | 8.4 |
| Tg1 & Tg2 (° C.) | 223 | 189 | 192&221 | 191&220 | 191&221 | 206 | 210 | 194 | 215 |
| HDT (° C.) | 198 | 166 | 192 | | | 183 | 188 | | |
| MVR at 400° C./2.16 kg/6' | 13 | | | | | 12.8 | 23 | 28 | 38 |

TABLE 2

| PROPERTY | PPSU | PSU | B-4 PPSU = 90% PSU = 10% | B-5 PPSU = 90% PSU = 10% | B-6 PPSU = 80% PSU = 20% |
|---|---|---|---|---|---|
| Mn | 80 | 90 | 80 | 93 | 68 |
| Mw | 111 | 129 | 115 | 132 | 96 |
| MWD | 1.39 | 1.44 | 1.44 | 1.41 | 4.41 |
| SPECIFIC GRAVITY | 1.290 | 1.235 | 1.28 | 1.28 | 1.27 |
| TENSILE | 74 | 76 | 70 | 76 | 78 |

TABLE 2-continued

| PROPERTY | PPSU | PSU | B-4<br>PPSU = 90%<br>PSU = 10% | B-5<br>PPSU = 90%<br>PSU = 10% | B-6<br>PPSU = 80%<br>PSU = 20% |
|---|---|---|---|---|---|
| STRENGTH (Mpa) | | | | | |
| TENSILE MODULUS (Mpa) | 2500 | 2300 | 2149 | 2165 | 2120 |
| ELONGATION @ BRECK % | >80 | >80 | 72 | 69 | 50 |
| IMPACT STRENGTH (J/M) | 650 | 45 | 586 | 723 | 113 |
| FLEXURAL STRENGTH (Mpa) | 100 | 114 | 99 | 115 | 122 |
| FLEXURAL MODULUS (Mpa) | 2200 | 2455 | 2291 | 2514 | 2637 |
| YIELD STRESS (%) | 8 | 7 | 8 | 9 | 8.6 |
| Tg. | 223 | 189 | 216 | 219 | 210 |
| HDT (° C.) | 198 | 166 | | 193.6 | 16.3 |
| MVR at 400° C./2.16 kg/6' CC/10 min. | 13 | 5 | 20.6 | 7.7 | 58.8 |

The higher impact properties, one intermediate Tg and transparency of granules indicate that B4, B5, B6 are block copolymers

Example 11

A Block-Copolymer of 75:25 PSU:PES (BC-07)

The following three part procedure was used to prepare this PSU-PES block copolymer.

Part 1: The Preparation of the PSU Homoblock

DMAc (873 gms, 950 ml/mole) and toluene (400 ml/mole) were placed in the flask, through which nitrogen gas was bubbled continuously, and heated to 45° C. Bisphenol A (684 gms) and 4,4'-dichlorodiphenyl sulfone (DCDPS) (886.8 gms) were added to the flask, the DCDPS and Bis Phenol A being in a molar ratio of 1.03:1.00, and the reaction mixture was stirred for 30 minutes. Anhydrous potassium carbonate (476 gms) was added. The toluene acts as an azeotropic solvent. The temperature of the reactants was slowly increased to 165° C. over 9 hours and the stirring speed was set to 400 rpm. The water formed due to the reaction was distilled over as an azeotrope with toluene and collected in the Dean-Stark trap. The toluene was then returned to the reaction mixture once it had been separated from the water. Once the water had been completely removed, toluene addition back to the reaction vessel was stopped. The toluene was then removed completely from the reaction mixture as the temperature of the reactants increased. The desired temperature was reached after 9 hours. The reaction temperature was then maintained at 165° C. and when the viscosity started to increase the stirring speed was raised to 500 rpm. At the required Mn of 13,000, MW of about 17,000 and MWD 1.36 the viscosity of the reaction mixture remained almost constant, indicating the end of the polymerization reaction.

Part 2: The Preparation of the PES Homoblock

A 4-necked, 3-litre glass flask was equipped with an overhead stirrer attached to a stainless steel paddle through its center neck. Through one of its side necks, a Cloisonné adapter was attached. The other neck of the Cloisonné adapter was attached to a Dean-Stark trap and a water-cooled condenser. A thermocouple thermometer was inserted through another of the side necks. A nitrogen gas inlet was inserted through the other side neck. The flask was placed in an oil bath, which was connected to a temperature controller.

Dimethyl acetamide (DMAc) (873 gms, 950 ml/mole) and toluene (344 gms, 400 ml/mole) were placed in the flask and heated to 45° C. DHDPS (257.5 gms) and 4,4'-dichlorodiphenyl sulfone (DCDPS) (287 gms) were added to the flask, the DHDPS and DCDPS being in a molar ratio of 1.03:1.00, and the reactants were stirred for 30 minutes. Anhydrous potassium carbonate (158.7 gms) was added to the flask. A nitrogen atmosphere was maintained in the flask by purging. The temperature of the reactants was slowly increased to 165° C. over 9 hours and the stirring speed set to 400 rpm. The water formed due to the reaction of $K_2CO_3$ with DHDPS was distilled over as an azeotrope with toluene and collected in the Dean-Stark trap. The toluene was then returned to the reaction mixture once it had been separated from the water. Once the water had been completely removed, toluene addition back to reaction vessel was stopped. The toluene was then removed completely from the reaction mixture as the temperature of the reactants increased. The desired temperature was reached after 9 hours. The reaction temperature was then maintained at 165° C. and when the viscosity started to increase the stirring speed was raised to 500 rpm. Once the viscosity increase slowed, a sample was taken out to check the molecular weight. The GPC Mn achieved was about 22,000, with a Mw of 25,000 and a MWD of 1.15. The reaction mixture was allowed to cool in preparation for its reaction with the product of part 2. The relatively high molar ratio of DCDPS to DHDPS gave PES of a relatively low molecular weight and with predominantly end groups of —Ph—Cl.

Part 3: The Preparation of the Block Copolymer

The reaction mixtures of Part 1 (3 parts) and Part 2 (1 part) were mixed by weight proportion and the block polymerization was conducted at 165° C. After the required MW was achieved, as shown by GPC, the reaction mixture was quenched with DMAc (376 gms, 400 ml/mole) and its temperature reduced to 140° C. Methyl Chloride gas was then bubbled through the reaction mixture for 5 hrs to ensure complete end capping. The reaction mixture was then diluted with DMAc (600 ml/mole) for a second time. The polymer solution was filtered through a 15 micron filter in a pressure filter funnel using 2 kg/cm² of nitrogen to remove any salts. The block copolymer was finally recovered by slowly adding the salt-free polymer solution to de-ionized water (13 ml/gm of polymer) under high-speed agitation. The precipitated polymer was then recovered by filtration. The precipitated polymer was ground and refluxed three times with de-ionized water at 90° C. to completely remove all salts and DMAc. The precipitated polymer was then filtered and dried in an oven at 140° C. until the moisture content as determined by Karl Fischer titration was <0.5%.

GPC analysis of the block copolymer showed an Mn of 77,000, an Mw of 108,000 and an MWD of 1.39 based on the polystyrene standards. Thus, the copolymer produced had a significantly higher molecular weight than the two homoblocks used as monomer units, indicating the preparation of a block copolymer. The block copolymer powder was then mixed with 0.3% heat stabilizer and granulated using a twin screw extruder. The Tg and the specific gravity of PSU are 190° C. and 1.24 respectively, whilst those of PES are 224° C. and 1.37. The transparent granules of block copolymer showed a DSC Tg of 198° C. and a specific gravity of 1.27. The transparency of the granules, the single GPC peak, the intermediate Tg and the specific gravity of the product clearly indicate that a block-copolymer of PSU and PES had indeed been formed and that the product was not simply a blend of the two homopolymers, PSU and PES. The remaining properties and also those of the blends are given in Table 1.

Example 12

A Block-Copolymer of 50:50 PSU:PES (B-8)

An experimental set up similar to that described in Example 1 was used.

Part 1: The Preparation of the PSU Homoblock

Dimethyl Acetamide (DMAc) (1786 gms, 950 ml/mole) and Toluene (688 gms, 400 ml/mole) were placed in the flask, through which nitrogen gas was bubbled continuously, and heated to 45° C. Bisphenol A (461 Gms) and 4,4'-dichlorodiphenyl sulfone (DCDPS) (574 gms) were added to the flask, the Bisphenol A and DCDPS being in a molar ratio of 1.01:1.00, and the reaction mixture was stirred for 30 minutes. Anhydrous potassium carbonate (318 gms) was added to the flask. The toluene acts as an azeotropic solvent.

The rest of the procedure is the same as that described in Part 1 of Example 1. The homoblock obtained had a GPC molecular weight of Mn 8,000, an Mw of 11,000 and an MWD of 1.43.

Part 2: The Preparation of the PES Homoblock

DMAc (1786 gms, 950 ml/mole) and toluene (688 gms, 400 ml/mole) were placed in the flask, through which nitrogen gas was bubbled continuously, and heated to 45° C. DHDPS (500 gms) and 4,4'-dichlorodiphenyl sulfone (DCDPS) (586 gms) were added to the flask, the DCDPS and DHDPS being in a molar ratio of 1.02:1.00, and the reactants were stirred for 30 minutes. Anhydrous potassium carbonate (318 gms) was added to the flask. The toluene acts as an azeotropic solvent.

The rest of the procedure is the same as that described in Part 2 of Example 1. The homoblock obtained had a GPC molecular weight of Mn 28,000, an Mw of 34,000 and an MWD of 1.21.

Part 3: The Preparation of the Block Copolymer

The reaction mixtures of Part 1 and Part 2 were mixed together and the block polymerization was conducted at 165° C. After the required GPC MW was achieved, the reaction mixture was quenched with DMAc (344 gms, 400 ml/mole) and its temperature reduced to 140° C. Methyl Chloride gas was then bubbled through the reaction mixture for 5 hrs to ensure complete end capping. The reaction mixture was then diluted with DMAc (600 ml/mole) for a second time. The polymer solution was passed through a 15 micron filter in a pressure filter funnel using 2 kg/cm² nitrogen to remove any salts. The block copolymer was finally recovered by slowly adding the salt-free polymer solution to de-ionized water (13 ml/gm of polymer) under high-speed agitation. The precipitated polymer was then recovered by filtration. The precipitated polymer was treated three times with refluxing de-ionized water at 90° C. The precipitated polymer was then filtered and dried in oven at 140° C. until the moisture content as determined by Karl Fisher titration was <0.5%.

GPC analysis of the block copolymer showed an Mn of 67,000, an Mw of 92,000 and an MWD of 1.37 based on the polystyrene standards. The block copolymer was then granulated as in Example 1 and its properties were measured. These were a Tg of 208° C. and a specific gravity of 1.3. This data, and the product being obtained as clear transparent granules, indicated that PES and PSU were present as a block copolymer and not simply as a blend of the two homopolymers. The remaining properties and also those of the blend of similar proportions are given in Table 1.

Example 13

A Block Copolymer of 25:75 PSU:PES (BC 09)

An experimental set up similar to that described in Example 1 was used.

Part 1: The Preparation of the PSU Homoblock

DMAc (893 gms, 950 ml/mole) and toluene (344 gms 400 ml/mole) were placed in the flask, through which nitrogen gas was bubbled continuously, and heated to 45° C. Bisphenol A (232 gms) and DCDPS (287 gms) were added to the flask, the Bisphenol A and DCDPS being in a molar ratio of 1.00:1.02, and the reaction mixture was stirred for 30 minutes. Anhydrous potassium carbonate (162 gms) was then added to the flask.

The rest of the procedure is same as that described in Part 1 of Example 1. The homoblock obtained had a GPC molecular weight of Mn 17,000, an Mw of 22,000 and an MWD of 1.29 based on the polystyrene standards.

Part 2: The Preparation of the PES Homoblock

DMAc (2679 gms, 950 ml/mole) and toluene (1032 gms, 400 ml/mole) were placed in the flask, through which nitrogen gas was bubbled continuously, and heated to 45° C. DHDPS (750 gms) and DCDPS (878 gms) were added to the flask, the DCDPS and DHDPS being in a molar ratio of 1.02:1.00, and the reactants were stirred for 30 minutes. Anhydrous potassium carbonate (476 gms, 1.15 mole/mole) added to the flask.

The rest of the procedure is same as that described in Part 2 of Example 1. The homoblock obtained had a GPC molecular weight of Mn 15,000, an Mw of 20,000 and an MWD of 1.33 based on the polystyrene standards.

Part 3: The Preparation of the Block Copolymer

The reaction mixtures of Part 1 (1 part) and Part 2 (3 parts) were mixed together and the block polymerization was conducted at 165° C. After the required GPC MW was achieved, the reaction mixture was quenched and the copolymer worked up as in Example 1.

GPC analysis of the copolymer showed an Mn of 68,000, an Mw of 104,000 and an MWD of 1.53. The block copolymer powder was then extruded and granulated as per the procedure given in Example 1. The DSC Tg of the copolymer was 218° C. and the specific gravity was 1.33. This data, and the product being obtained as light amber colored transparent granules, indicated that the polymer obtained was indeed a block copolymer and not simply a blend of PSU and PES. The remaining properties and also those of the blends are given in Table 3.

Example 14

A Block Copolymer of 10:90 PSU:PES (BC 10)

An experimental set up similar to that described in Example 1 was used.

Part 1: The Preparation of the PSU Homoblock

DMAc (357 gms, 950 ml/mole) and toluene (138 gms 400 ml/mole) were placed in the flask, through which nitrogen gas was bubbled continuously, and heated to 45° C. Bisphenol A (93 gms) and DCDPS (115 gms) were added to the flask, the Bisphenol A and DCDPS being in a molar ratio of 1.02:1.00, and the reaction mixture was stirred for 30 minutes. Anhydrous potassium carbonate (65 gms) was then added to the flask.

The rest of the procedure is same as that described in Part 1 of Example 1. The homoblock obtained had a GPC molecular weight of Mn 49,000, an Mw of 63,000 and an MWD of 1.29 based on the polystyrene standards.

Part 2: The Preparation of the PES Homoblock

DMAc (3215 gms, 950 ml/mole) and toluene (1238 gms, 400 ml/mole) were placed in the flask, through which nitrogen gas was bubbled continuously, and heated to 45° C. DHDPS (900 gms) and DCDPS (1044 gms) were added to the flask, the DCDPS and DHDPS being in a molar ratio of 1.01:1.00, and the reactants were stirred for 30 minutes. Anhydrous potassium carbonate (571 gms, 1.15 mole/mole) added to the flask.

The rest of the procedure is same as that described in Part 2 of Example 1. The homoblock obtained had a GPC molecular weight of Mn 35,000, an Mw of 51,000 and an MWD of 1.46 based on the polystyrene standards.

Part 3: The Preparation of the Block Copolymer

The reaction mixtures of Part 1 (1 part) and Part 2 (9 parts) were mixed together and the block polymerization was conducted at 165° C. After the required GPC MW was achieved, the reaction mixture was quenched and the copolymer worked up as in Example 1.

GPC analysis of the copolymer showed an Mn of 87,000, an Mw of 113,000 and an MWD of 1.29. The block copolymer powder was then extruded and granulated as per the procedure given in Example 1. The DSC Tg of the copolymer was 222° C. and the specific gravity was 1.357. This data, and the product being obtained as light amber colored transparent granules, indicated that the polymer obtained was indeed a block copolymer and not simply a blend of PSU and PES. The remaining properties and also those of the blends are given in Table 3.

Example 15

Physical Blends of PSU and PES:

In order to study the properties of the physical blending of PPSU and PSU dry blending of the powders was carried out in the following proportions, followed by extrusion on ZE 25 twin screw extruder and evaluation (Table 3).

| | |
|---|---|
| C1: | PSU powder (75%) + PES powder (25%) |
| C2: | PSU powder (50%) + PES Powder (50%) |
| C3: | PSU powder (25%) + PES powder (75%) |
| C4: | PSU powder (10%) + PES powder (90%) |

The PES used was the commercially available GAFONE-3300 grade and the PSU used was the commercially available GAFONE-S PSU 1300, both from Gharda Chemicals Ltd. India.

TABLE 3

PROPERTIES COMPARISION OF PPSU-PSU COPOLYMERS WITH NEAT PSU & NEAT PES & THEIR BLENDS

| PROPERTY | PES | PSU | C-1 PSU = 75% PES = 25% | C-2 PSU = 50% PES = 50% | C-3 PSU = 25% PES = 75% | C-4 PSU = 90% PES = 10% | BC-7 PSU = 75% PES = 25% | BC-8 PSU = 50% PES = 50% | BC-9 PSU = 25% PES = 75% | BC-10 PSU = 10% PES = 90% |
|---|---|---|---|---|---|---|---|---|---|---|
| Mn | 86 | 90 | In all cases Extrusion was not FAILED due to immiscibility of PES & PSU. | | | | 77 | 67 | 68 | 87 |
| Mw | 120 | 129 | | | | | 108 | 92 | 104 | 113 |
| MWD | 1.39 | 1.44 | | | | | 1.39 | 1.37 | 1.53 | 1.29 |
| SPECIFIC GRAVITY | 1.37 | 1.235 | | | | | 1.27 | 1.3 | 1.33 | 1.357 |
| TENSILE STRENGTH (Mpa) | | 76 | | | | | 82 | 72 | 88 | |
| TENSILE MODULUS (Mpa) | | 2300 | | | | | 1993 | 2457 | 2110 | |

TABLE 3-continued

PROPERTIES COMPARISION OF PPSU-PSU COPOLYMERS WITH NEAT PSU & NEAT PES & THEIR BLENDS

| PROPERTY | PES | PSU | C-1 PSU = 75% PES = 25% | C-2 PSU = 50% PES = 50% | C-3 PSU = 25% PES = 75% | C-4 PSU = 90% PES = 10% | BC-7 PSU = 75% PES = 25% | BC-8 PSU = 50% PES = 50% | BC-9 PSU = 25% PES = 75% | BC-10 PSU = 10% PES = 90% |
|---|---|---|---|---|---|---|---|---|---|---|
| ELONGATION @ BRECK % | | ☐ 80 | | | | | 53 | 25 | 17 | |
| IMPACT STRENGTH (J/M) | | 45 | | | | | 4.8 | 4.9 | 5.1 | 5.2 |
| YIELD STRESS (%) | | 7 | | | | | 7.5 | 7.3 | 7.7 | |
| Tg1 & Tg2 (° C.) | | 189 | | | | | 198 | 208 | 218 | 223 |
| HDT (° C.) | | 166 | | | | | | | | |
| MVR at 380° C./ 2.16 kg/6' | | | | | | | 40.25 | | 28 | 60.9 |

The g and transparency of granules indicate that BC7, BC8, BC9 & BC10 are block copolymers and not just physical mixtures like C1, C2, C3 & C4, are not miscible.

Example 16

A Block-Copolymer of 90:10 PES: PPSU (D-2)

The following three part procedure was used to prepare this PES-PPSU block copolymer.

Part 1: The Preparation of the PES Homoblock

DMAc (2876 gms, 850 ml/mole) and toluene (400 ml/mole) were placed in the flask, through which nitrogen gas was bubbled continuously, and heated to 65° C. 4,4'-dihydroxydiphenyl sulfone (DHDPS) (900 gms) and 4,4'-dichlorodiphenyl sulfone (DCDPS) (1044 gms) were added to the flask, the DCDPS and DHDPS being in a molar ratio of 1.01:1.00, and the reaction mixture was stirred for 30 minutes. Anhydrous potassium carbonate (572 gms) was added. The toluene acts as an azeotropic solvent. The temperature of the reactants was slowly increased to 165° C. over 9 hours and the stirring speed was set to 400 rpm. The water formed due to the reaction was distilled over as an azeotrope with toluene and collected in the Dean-Stark trap. The toluene was then returned to the reaction mixture once it had been separated from the water. Once the water had been completely removed, toluene addition back to the reaction vessel was stopped. The toluene was then removed completely from the reaction mixture as the temperature of the reactants increased. The desired temperature was reached after 9 hours. The reaction temperature was then maintained at 165° C. and when the viscosity started to increase the stirring speed was raised to 500 rpm. At the required Mn of 11,000, MW of about 14,000 and MWD 1.20 the viscosity of the reaction mixture remained almost constant, indicating the end of the polymerization reaction.

Part 2: The Preparation of the PPSU Homoblock

A 4-necked, 3-litre glass flask was equipped with an overhead stirrer attached to a stainless steel paddle through its center neck. Through one of its side necks, a Cloisonné adapter was attached. The other neck of the Cloisonné adapter was attached to a Dean-Stark trap and a water-cooled condenser. A thermocouple thermometer was inserted through another of the side necks. A nitrogen gas inlet was inserted through the other side neck. The flask was placed in an oil bath, which was connected to a temperature controller.

Dimethyl acetamide (DMAc) (357 gms, 950 ml/mole) and toluene (400 ml/mole) were placed in the flask and heated to 45° C. Biphenol (75.9) and 4,4'-dichlorodiphenyl sulfone (DCDPS) (114.8 gms) were added to the flask, the Biphenol and DCDPS being in a molar ratio of 1.02:1.00, and the reactants were stirred for 30 minutes. Anhydrous potassium carbonate (61 gms) Anhydrous Sodium carbonate (8.5 gms) ware added to the flask. A nitrogen atmosphere was maintained in the flask by purging. The temperature of the reactants was slowly increased to 165° C. over 9 hours and the stirring speed set to 400 rpm. The water formed due to the reaction of $K_2CO_3$ & $Na_2CO_3$ with Biphenol was distilled over as an azeotrope with toluene and collected in the Dean-Stark trap. The toluene was then returned to the reaction mixture once it had been separated from the water. Once the water had been completely removed, toluene addition back to reaction vessel was stopped. The toluene was then removed completely from the reaction mixture as the temperature of the reactants increased. The desired temperature was reached after 9 hours. The reaction temperature was then maintained at 165° C. and when the viscosity started to increase the stirring speed was raised to 500 rpm. Once the viscosity increase slowed, a sample was taken out to check the molecular weight. The GPC Mn achieved was about 17,000, with a Mw of 22,000 and a MWD of 1.33. The reaction mixture was allowed to cool in preparation for its reaction with the product of part 2. The relatively high molar ratio of DCDPS to Biphenol gave PPSU of a relatively low molecular weight and with predominantly end groups of —Ph—Cl.

Part 3: The Preparation of the Block Copolymer

The reaction mixtures of Part 1 (9 part) and Part 2 (1 part) were mixed by weight proportion and the block polymerization was conducted at 165° C. After the required MW was achieved, as shown by GPC, the reaction mixture was quenched with DMAc (376 gms, 400 ml/mole) and its temperature reduced to 140° C. Methyl Chloride gas was then bubbled through the reaction mixture for 5 hrs to ensure complete end capping. The reaction mixture was then diluted with DMAc (600 ml/mole) for a second time. The polymer solution was filtered through a 15 micron filter in a pressure filter funnel using 2 kg/cm² of nitrogen to remove any salts. The block copolymer was finally recovered by slowly adding the salt-free polymer solution to de-ionized water (13 ml/gm of polymer) under high-speed agitation. The precipitated polymer was then recovered by filtration. The precipitated polymer was ground and refluxed three times with de-ionized water at 90° C. to completely remove all salts and DMAc. The precipitated polymer was then filtered and dried in an oven at 140° C. until the moisture content as determined by Karl Fischer titration was <0.5%.

GPC analysis of the block copolymer showed an Mn of 78,000, an Mw of 112,000 and an MWD of 1.43 based on the polystyrene standards. Thus, the copolymer produced had a significantly higher molecular weight than the two homoblocks used as monomer units, indicating the preparation of a block copolymer. The block copolymer powder was then mixed with 0.3% heat stabilizer and granulated using a twin screw extruder. The Tg and the specific gravity of PES are 224° C. and 1.37 respectively, whilst those of PPSU are 223° C. and 1.29. The transparent granules of block copolymer showed a DSC Tg of 224° C. and a specific gravity of 1.36. The transparency of the granules, the single GPC peak, the intermediate Tg and the specific gravity of the product clearly indicate that a block-copolymer of PES and PPSU had indeed been formed and that the product was not simply a blend of the two homopolymers, PES and PPSU.

Various homoblocks can be prepared using one or more dichloro compounds and one or more dihydroxy compounds, some of which are listed below:

Aromatic Dihalo Compounds

Dichloro diphenyl sulfone (DCDPS), 4,4' Bis(4-chlorophenyl sulfonyl)biphenyl (CSB), Dichloro Benzophenone, Dichloro diphenyl ether, Dichloro biphenyl, Dichloro diphenyl methylene, Di Methyl dichloro diphenyl sulfone, tetra methyl dichloro diphenyl sulfone.

Aromatic Dihydroxy Compounds

Dihydroxy diphenyl Sulfone (DHDPS), Bisphenol A, Biphenol, Hydroquinone, Dimethyl Dihydroxy diphenyl sulfone, Tetramethyl dihydroxy diphenyl sulfone, Tetramethyl Bisphenol A, Tetramethyl Biphenol.

Example 17

A Block-Copolymer of 75:25 PES:PPSU (MPES # S-01)

The following three part procedure was used to prepare this PES-PPSU block copolymer.

Part 1: The Preparation of the PES Homoblock

A 4-necked, 3-litre glass flask was equipped with an overhead stirrer attached to a stainless steel paddle through its center neck. The other neck of the flask attached with steel head and vertical cooled condenser. A thermocouple thermometer was inserted through another of the side necks. A nitrogen gas inlet was inserted through the other side neck. The flask was placed in an oil bath, which was connected to a temperature controller.

Sulfolane (945 gms, 750 ml/mole) were placed in the flask and heated to 45° C. and 4,4'-dichlorodiphenyl sulfone (DCDPS) (222 gms) and 4,4'Dihydroxy Diphenyl sulfone (DHDPS) (187.5 gms) were added to the flask, the DCDPS and DHDPS being in a molar ratio of 1.03:1.00, and the reactants were stirred for 30 minutes. Anhydrous sodium carbonate (94 gms) were added to the flask. A nitrogen atmosphere was maintained in the flask by purging. The temperature of the reactants was slowly increased to 225° C. over 6 hours and the stirring speed set to 400 rpm. The water formed due to the reaction of $Na_2CO_3$ with DHDPS was distilled through condenser. The reaction temperature was then maintained at 220° C. and when the viscosity started to increase the stirring speed was raised to 500 rpm. Once the viscosity increase slowed, a sample was taken out to check the molecular weight. The GPC Mn achieved was about 24,000, with a Mw of 34,000 and a MWD of 1.37. The reaction mixture was allowed to cool in preparation for its reaction with the product of part 2. The relatively high molar ratio of DCDPS to DHDPS gave PES of a relatively low molecular weight and with predominantly end groups of —Ph—Cl.

Part 2: The Preparation of the PPSU Homoblock

Sulfolane (315 gms, 250 ml/mole) and toluene (400 ml/mole) were placed in the flask, through which nitrogen gas was bubbled continuously, and heated to 45° C. 4,4'-dichlorodiphenyl sulfone (DCDPS) (71.75 gms) and Biphenol (48 gm) were added to the flask, and Biphenol:DCDPS being in a molar ratio of 1.03:1.00, and the reaction mixture was stirred for 30 minutes. Anhydrous potassium carbonate (39.7 gms) was added. The toluene acts as an azeotropic solvent. The temperature of the reactants was slowly increased to 190° C. over 4 hours and the stirring speed was set to 400 rpm. The water formed due to the reaction was distilled over as an azeotrope with toluene and collected in the Dean-Stark trap. The toluene was then returned to the reaction mixture once it had been separated from the water. Once the water had been completely removed, toluene addition back to the reaction vessel was stopped. The toluene was then removed completely from the reaction mixture as the temperature of the reactants increased. The desired temperature was reached after 4 hours. The reaction temperature was then maintained at 190° C. and when the viscosity started to increase the stirring speed was raised to 500 rpm. At the required Mn of 18,000, MW of about 22,000 and MWD 1.14 The relatively high molar ratio of Biphenol to DCDPS gave PPSU of a relatively low molecular weight and with predominantly end groups of —Ph—OH Part 3: The Preparation of the Block Copolymer The reaction mixtures of Part 1 and Part 2 were mixed in equal proportions by weight and the block polymerization was conducted at 220° C. After the required MW was achieved, as shown by GPC, the reaction mixture was quenched with Sulfolane (252 gms, 200 ml/mole) and its temperature reduced to 210° C. Methyl Chloride gas was then bubbled through the reaction mixture for 3 hrs to ensure complete end capping. The reaction mixture was then diluted with Sulfolane (400 ml/mole) for a second time. The polymer solution was filtered through a 15 micron filter in a pressure filter funnel using 2 kg/cm² of nitrogen to remove any salts. The block copolymer was finally recovered by slowly adding the salt-free polymer solution to de-ionized water (13 ml/gm of polymer) under high-speed agitation. The precipitated polymer was then recovered by filtration. The precipitated polymer was ground and refluxed three times with de-ionized water at 90° C. to completely remove all salts and Sulfolane. The precipitated polymer was then filtered and dried in an oven at 140° C. until the moisture content as determined by Karl Fischer titration was <0.5%.

GPC analysis of the block copolymer showed an Mn of 85,000, an Mw of 119,000 and an MWD of 1.39 based on the polystyrene standards. Thus, the copolymer produced had a significantly higher molecular weight than the two homoblocks used as monomer units, indicating the preparation of a block copolymer. The block copolymer powder was then mixed with 0.25% heat stabilizer and granulated using a twin screw extruder. The Tg and the specific gravity of PES are 225° C. and 1.37 respectively, whilst those of PPSU are 222° C. and 1.290. The transparent granules of block copolymer showed a DSC Tg of 224° C. and a specific gravity of 1.34. The transparency of the granules, the single GPC peak, the intermediate Tg and the specific gravity of the product clearly indicate that a block-copolymer of PES and PPSU had indeed been formed and that the product was not simply a blend of the two homopolymers, PES and PPSU.

Example 18

A Block-Copolymer of 50:50 PSSD:PSSB (MPSS #2)

The following three part procedure was used to prepare this PSSD-PSSB block copolymer.
PSSD: PSS made by using DHDPS and CSB as monomer Part 1: The Preparation of the PSSD Homoblock A 4-necked, 10-liter glass flask was equipped with an overhead stirrer attached to a stainless steel paddle through its center neck. The other neck of the flask attached with steel head and vertical cooled condenser. A thermocouple thermometer was inserted through another of the side necks. A nitrogen gas inlet was inserted through the other side neck. The flask was placed in an oil bath, which was connected to a temperature controller.

Sulfolane (4410 gms, 3500 ml/mole) and toluene (1000 ml/mole) were placed in the flask, through which nitrogen gas was bubbled continuously, and heated to 45° C. 4,4' Bis [(4-Chlorophenyl) Sulfonyl] Biphenyl (CSB) (523 gms) and 4,4' Dihydroxy diphenyl sulfone (DHDPS) (250 gms) were added to the flask and CSB:DHDPS being in a molar ratio of 1.04:1.00 and the reaction mixture was stirred for 30 minutes. Anhydrous sodium carbonate (123 gms) was added. A nitrogen atmosphere was maintained in the flask by purging. The toluene acts as an azeotropic solvent. The temperature of the reactants was slowly increased to 220° C. over 5 hours and the stirring speed was set to 400 rpm. The water formed due to the reaction of Na2CO3 with DHDPS was distilled over as an azeotrope with toluene and collected in the Dean-Stark trap. The toluene was then returned to the reaction mixture once it had been separated from the water. Once the water had been completely removed, toluene addition back to the reaction vessel was stopped. The toluene was then removed completely from the reaction mixture as the temperature of the reactants increased. The desired temperature was reached after 5 hours. The reaction temperature was then maintained at 220° C. and when the viscosity started to increase the stirring speed was raised to 500 rpm. At the required Mn of 17,000, MW of about 20,000 and MWD 1.19 The relatively high molar ratio of CSB to DHDPS gave PSSD of a relatively low molecular weight and with predominantly end groups of —Ph—Cl Part 2: The Preparation of the PSSB Homoblock PSSB:PSS made by using Biphenol and CSB as monomer
Sulfolane (4410 gms, 3500 ml/mole) and toluene (1000 ml/mole) were placed in the flask, through which nitrogen gas was bubbled continuously, and heated to 45° C.

4,4' Bis [(4-Chlorophenyl) Sulfonyl] Biphenyl (CSB) (503 gms) and Biphenol (188 gms) were added to the flask and Biphenol:CSB being in a molar ratio of 1.01:1.00, and the reaction mixture was stirred for 30 minutes. Anhydrous sodium carbonate (123 gms) was added. The toluene acts as an azeotropic solvent. The temperature of the reactants was slowly increased to 220° C. over 5 hours and the stirring speed was set to 400 rpm. The water formed due to the reaction was distilled over as an azeotrope with toluene and collected in the Dean-Stark trap. The toluene was then returned to the reaction mixture once it had been separated from the water. Once the water had been completely removed, toluene addition back to the reaction vessel was stopped. The toluene was then removed completely from the reaction mixture as the temperature of the reactants increased. The desired temperature was reached after 4 hours. The reaction temperature was then maintained at 220° C. and when the viscosity started to increase the stirring speed was raised to 500 rpm. At the required Mn of 29,000, MW of about 38,000 and MWD 1.31 The relatively high molar ratio of Biphenol to CSB gave PSSB of a relatively low molecular weight and with predominantly end groups of —Ph—OH Part 3: The Preparation of the Block Copolymer The reaction mixtures of Part 1 and Part 2 were mixed in equal proportions by weight and the block polymerization was conducted at 220° C. After the required MW was achieved, as shown by GPC, the reaction mixture was quenched with Sulfolane (504 gms, 400 ml/mole) and its temperature reduced to 210° C. Methyl Chloride gas was then bubbled through the reaction mixture for 3 hrs to ensure complete end capping. The reaction mixture was then diluted with Sulfolane (400 ml/mole) for a second time. The polymer solution was filtered through a 15 micron filter in a pressure filter funnel using 2 kg/cm$^2$ of nitrogen to remove any salts. The block copolymer was finally recovered by slowly adding the salt-free polymer solution to de-ionized water (13 ml/gm of polymer) under high-speed agitation. The precipitated polymer was then recovered by filtration. The precipitated polymer was ground and refluxed three times with de-ionized water at 90° C. to completely remove all salts and Sulfolane. The precipitated polymer was then filtered and dried in an oven at 140° C. until the moisture content as determined by Karl Fischer titration was <0.5%.

GPC analysis of the block copolymer showed an Mn of 88,000, an Mw of 121,000 and an MWD of 1.37 based on the polystyrene standards. Thus, the copolymer produced had a significantly higher molecular weight than the two homoblocks used as monomer units, indicating the preparation of a block copolymer. The block copolymer powder was then mixed with 0.25% heat stabilizer and granulated using a twin screw extruder. The Tg and the specific gravity of PSSD are 259° C. and 1.29 respectively, while those of PSSB are 270° C. and 1.320. The transparent granules of block copolymer showed a DSC Tg of 266° C. and a specific gravity of 1.31. The transparency of the granules, the single GPC peak, the intermediate Tg and the specific gravity of the product clearly indicate that a block-copolymer of PSSD and PSSB had indeed been formed and that the product was not simply a blend of the two homo polymers, PSSD and PPSB.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:

1. A process for preparing a block copolymer, comprising:
    preparing at least one first polysulfone homoblock having a molecular weight of at least 1000, comprising heating at least one first aromatic diol compound with at least one first aromatic dihalo compound in the presence of at least one alkali, wherein at least one of the first aromatic diol compound and the first aromatic dihalo compound comprises at least one sulfone group, the first polysulfone homoblock comprising two first end groups;
    preparing at least one second polysulfone homoblock having a molecular weight of at least 1000, comprising heating at least one second aromatic diol compound with at least one second aromatic dihalo compound in the presence of at least one alkali, wherein at least one of the second aromatic diol compound and the aromatic dihalo compound comprises at least one sulfone group, the second polysulfone homoblock comprising two second end groups;
    reacting the at least one first polysulfone homoblock and the at least one second polysulfone homoblock to produce a reaction mass comprising the block copolymer having a molecular weight of at least 2000; and
    recovering the block copolymer from the reaction mass, wherein each of the two first end groups and the two second end groups comprises two end groups that are different from each other.

2. The process of claim 1, wherein at least one of the two first end groups is the same as or is different from at least one of the two second end groups.

3. The process of claim 2, wherein the two end groups that are different from each other comprise a halogen end group and a hydroxyl end group or a salt of a hydroxyl end group.

4. The process of claim 3, wherein the salt of the hydroxyl end group is selected from the group consisting of —OK, —ONa, and —OLi.

5. The process of claim 3, wherein the halogen end group is selected from the group consisting of —F, —Cl, —Br, and —I.

6. The process of claim 3, wherein halogen end groups and hydroxyl end groups are present in a ratio of about 1:1, halogen end groups: hydroxyl end groups.

7. The process of claim 3, wherein the at least one first aromatic diol compound and the at least one first dihalo compound are present in near equal molar ratio, to produce the at least one first polysulfone homoblock having both a halogen end group and a hydroxyl end group on each homoblock.

8. The process of claim 3, wherein the at least one second aromatic diol compound and the at least one second dihalo compound are present in near equal molar ratio, to produce the at least one second polysulfone homoblock having both a halogen end group and a hydroxyl end group on each homoblock.

* * * * *